(No Model.)
C. SOOYSMITH.
PROCESS OF PREPARING SOIL FOR TUNNELING AND EXCAVATING.
No. 340,162. Patented Apr. 20, 1886.
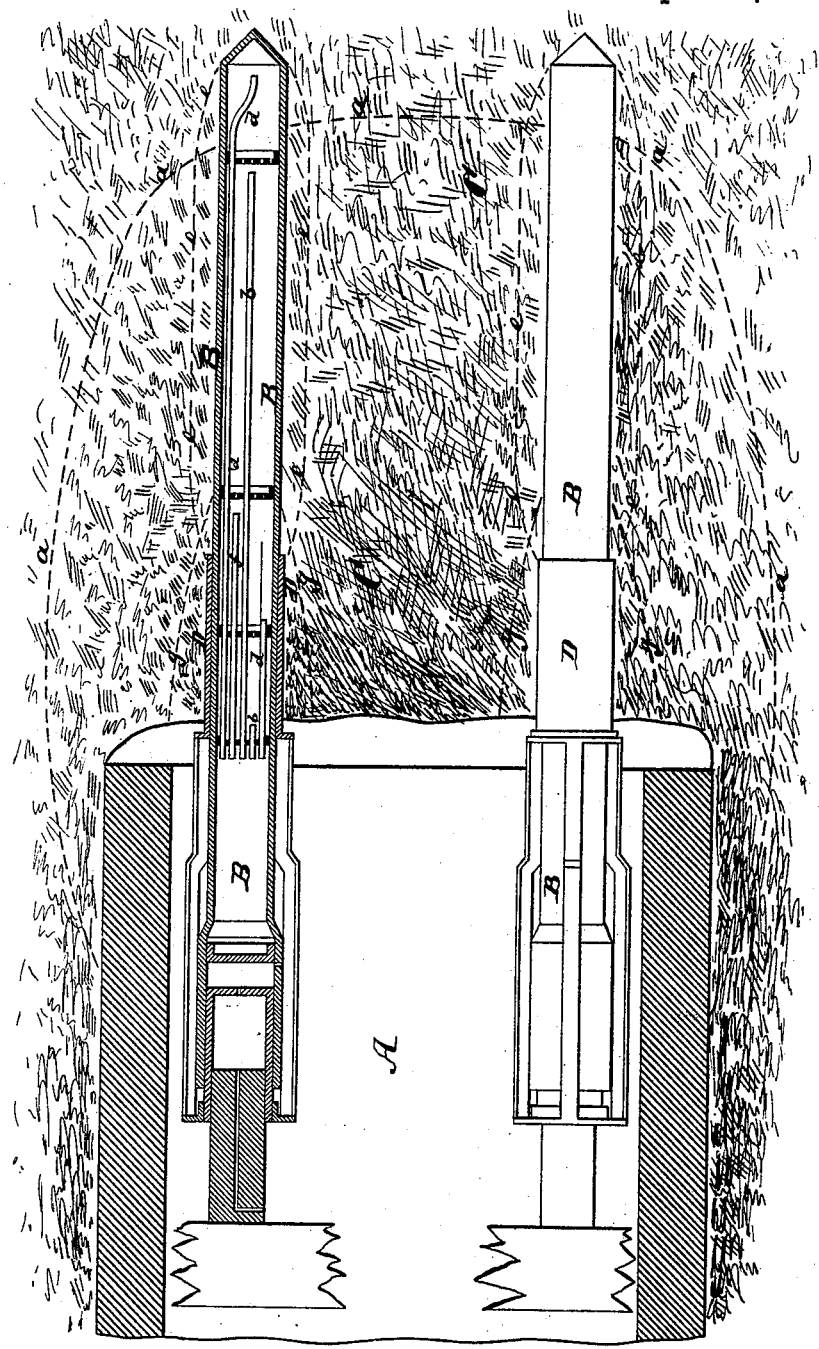
WITNESSES:
John M. Speer.
Gustav Schneppé.
INVENTOR
Charles Sooysmith
BY
Briesen & Steele
ATTORNEYS.

UNITED STATES PATENT OFFICE.

CHARLES SOOYSMITH, OF NEW YORK, N. Y.

PROCESS OF PREPARING SOIL FOR TUNNELING AND EXCAVATING.

SPECIFICATION forming part of Letters Patent No 340,162, dated April 20, 1886.

Application filed February 27, 1886. Serial No. 193,405. (No model.)

*To all whom it may concern:*

Be it known that I, CHARLES SOOYSMITH, of the city, county, and State of New York, have invented an Improved Process of Preparing Soil for Tunneling and Excavating, of which the following is a complete specification, reference being had to the accompanying drawing.

This invention relates to a new process of treating quicksand, mud, or other soft soil so that it may be conveniently tunneled.

My present invention seeks to utilize the apparatus for which I have filed an application for Letters Patent January 22, 1886. No. 189,367, said application having been allowed February 23, 1886.

The present invention, in substance, consists in preparing soft soil for tunneling by first freezing it with the aid of pipes which contain the freezing substance, and then in part thawing the soil around such pipes to permit of their further advancement through the soil.

Before my present invention the idea had already been suggested of solidifying quicksand, mud, or other soft soil by freezing. for the purpose of sinking shafts, tunneling, and the like; but I have found that for constructing a tunnel or other excavation of a greater length than the freezing-pipes it becomes necessary from time to time to advance these pipes or insert new ones, in order to be able to progress with the work of excavating or tunneling. This advancement of the pipes I render possible by thawing the soil at the proper time around each pipe, leaving the bulk of the soil, however, in the frozen condition, so that it will not collapse while the pipes are being advanced.

In the accompanying drawing the apparatus for carrying my invention into effect is illustrated in vertical longitudinal section.

A in this drawing represents a part of a tunnel or other excavation in soft soil.

B B are the freezing-pipes, which are inserted in the soil C, for the purpose of solidifying it, so that the tunnel may be advanced by working in the frozen material. The lines *a a* show the extent to which the soft soil is supposed to be frozen or solidified by the freezing-fluid, which at the proper time is caused to traverse the pipes B B. It will be readily understood that if I had only these freezing-pipes and means to utilize them as such they could not be pushed forward in the soil unless the head of the tunnel or excavation was advanced to the limit of the frozen portion of the ground, in which case the soft character of the soil at or very near to the heading would be liable to fall into the excavation and seriously check the progress of the work. My intention is, for the purpose of obviating this difficulty and permitting the pipes B B to be advanced through the frozen portion of the ground, to provide the pipes with means for thawing their immediate surroundings, so that there would be produced around each of the pipes B B a zone of softened or thawed material, through which such pipes could be pushed forward, while the bulk of the soil would remain frozen.

The tubes *b b*, which are shown in the upper pipe, B, of Figure 1, indicate the conduits for the freezing-fluid, which, when passed through the pipes B B, will cause the soil to freeze up to the line *a*.

The tubes *d d* in the upper pipe, B, Fig. 1, indicate the conduits for letting a thawing-fluid into the pipe B, and when this thawing-fluid is allowed to circulate each pipe B will be surrounded by a zone, *e*, of thawed ground, through which the said pipes can now be pushed forward as far as desired, whereupon the thawing process is stopped and freezing is resorted to to permit the tunnel or excavation to be carried farther on.

It will be perceived from an inspection of the drawing that the thaw-line *e* around each pipe B does not extend fully to the head of the tunnel or excavation, and that therefore there is no danger of the heading falling in because softened by the thawing.

Encircling each pipe B for some distance from the heading into the frozen mass is or may be a sleeve, D. Whenever the thawing-pipes *d* are made use of to produce the zones *e e* of softened matter, the pipes B B are pushed forward the desired distance by hydraulic or other pressure. The vehicle of heat not having circulated near the heading, the frozen mass remains as such at the heading, and each pipe B, when pushed forward, moves through the sleeve D, that surrounds it, and that prevents the thawed material about the pipe B from coming into the excavated space.

After the material about a pipe, B, has been again frozen some distance beyond the sleeve the ground immediately around each sleeve is slightly thawed by using a shorter pipe, f, as a conduit for the heating-fluid, and, pressure being applied to the sleeve, this, too, can now be pushed forward. The sleeves D D may be dispensed with where the soil is of a muddy nature, because in that case the muddy material, owing to its semi-solid consistency, will not flow backward along the pipes B B, even if the ground immediately around them is thawed to the heading to permit their advancement.

When the pipes B B, with or without the sleeves D D, have been moved forward, the excavation is also carried forward and the lining E built before the frozen mass near the unwalled excavated space can thaw. With a small tunnel one pipe B will suffice.

I may, if found desirable, provide a means of drilling through the pipe B without changing materially the arrangement described; or I may arrange a jet of water to play against the material at the end of the pipe B while the latter is being pushed forward.

It will be seen from the foregoing description that where the sleeves D D are used there are three operations of thawing and freezing, namely:

First. The ground is frozen to the lines a. This is done by using the pipes b as conduits for the freezing-fluid.

Second. The ground is thawed around each pipe B up to the limits e, and the pipes B B are then pushed forward.

Third. The ground is thawed around each sleeve D up to the limit g, and the sleeves D D are then pushed forward. Afterward the ground is again frozen around the pipe and sleeve.

I desire it to be understood that when I mention a "tunnel" in this specification I mean any excavation in a horizontal, vertical, or other direction, of any kind whatsoever to which the invention described is applicable.

I claim.

1. The process of preparing soft soil for tunneling, which consists in first freezing the soil around one or more pipes, in then thawing part of the frozen soil around each of the pipes, and in then advancing said pipes through the thawed portion and freezing again, substantially as described.

2. The process of preparing soft soil for tunneling, which consists in first freezing the ground around one or more pipes and sleeves, in then thawing around each pipe, in then advancing each pipe through the thawed ground, in then thawing around each sleeve and advancing each sleeve through the thawed portion, and in finally freezing the thawed portion again, as specified.

CHARLES SOOYSMITH.

Witnesses:
CHARLES G. M. THOMAS,
HARRY M. TURK.